United States Patent
Metz

(10) Patent No.: US 9,009,174 B1
(45) Date of Patent: Apr. 14, 2015

(54) CONSUMER ACTION MINING

(71) Applicant: Philipp Metz, Bremen (DE)

(72) Inventor: Philipp Metz, Bremen (DE)

( * ) Notice: Subject to any disclaimer, the term of this patent is extended or adjusted under 35 U.S.C. 154(b) by 283 days.

(21) Appl. No.: 13/735,753

(22) Filed: Jan. 7, 2013

Related U.S. Application Data

(60) Provisional application No. 61/584,090, filed on Jan. 6, 2012.

(51) Int. Cl.
*G06F 17/30* (2006.01)
(52) U.S. Cl.
CPC ............................ *G06F 17/30569* (2013.01)
(58) Field of Classification Search
CPC ........... G06Q 30/0254; G06Q 30/0255; G06F 17/30569; G06F 17/30312
See application file for complete search history.

(56) References Cited

U.S. PATENT DOCUMENTS

2005/0038533 A1* 2/2005 Farrell et al. .................... 700/73

OTHER PUBLICATIONS

Hofmann et al. ("Latent Class Models for Collaborative Filtering", IJCAI 1999, 6 pages.*

* cited by examiner

*Primary Examiner* — Rehana Perveen
*Assistant Examiner* — Alexander Khong
(74) *Attorney, Agent, or Firm* — Aka Chan LLP

(57) ABSTRACT

A methodology infers latent or unobserved structure in relational datasets, and is used to analyze user behaviors and patterns. The data for user behaviors and patterns can be gathered from off-line activity or interactions, such as, but not limited to, retail statistics, statistical research, scientific analysis, off-line interaction between, for example, customers or users. And the analysis can be applied to, but not limited to, the analysis of credit card data, club card data, telephone data, research data, financial market data, insurance data, warehouse data, travel data, traffic data, health care system data, public administration and authorities data, logistics data, education based data, as well as behavioral pattern data.

7 Claims, 7 Drawing Sheets

CONSUMER ACTION MINING

CROSS-REFERENCE TO RELATED APPLICATIONS

This patent application claims the benefit of U.S. provisional patent application 61/584,090, filed Jan. 6, 2012, which is incorporated by reference along with other cited references in this application.

BACKGROUND OF THE INVENTION

This invention relates to software, and more specifically a methodology to infer latent or unobserved structure in relational data sets.

Relational data is inherently high dimensional, inherently sparse and often binary. High dimensional in the context of consumer action mining (CAM) means, that users choose from a very large set of objects, each object representing one dimension in "feature space" and objects are chosen by a very large set of consumers, each of which represents one dimension in a "preference space." Sparse means that typically, one can only observe the interaction of an agent with a very small number of objects, i.e., only a few objects are actually viewed, bought, and so forth, by any agent user out of a catalogue of many more objects. Binary means that generally, one can only observe an interaction between an agent and an object or not. There is often no measure of strength of an interaction, i.e., "how much" a user prefers one object over another.

Previous approaches have employed a two-step strategy. First, reduce the high dimensionality of the dataset and thereby remove the inherent sparsity of the relational dataset, i.e., minimizing some error function or distortion between the original data and the dimension-reduced data performs dimensionality reduction. Second, employ a clustering algorithm on the dimensionality reduced data, i.e., find a segmentation of the dimension-reduced data that maximizes some quality function.

A two-step strategy of dimensionality reduction and subsequent clustering employed by previous approaches can yield to the injection of bias and noise in the data, as a segmentation is not performed on the raw data, but rather on a transformed and compressed representation which is necessarily distorted. While it is clear that this distortion is detrimental to the accuracy of any subsequent clustering technique, it was assumed to be necessary as state of the art clustering algorithms are unable to handle large high-dimensional and sparse data sets.

Therefore, there is a need for improved techniques.

BRIEF SUMMARY OF THE INVENTION

This procedure describes a methodology to infer latent (unobserved) structure in relational datasets.

An example of this may be the discovery of collective preference of a group of consumers for a class of certain types of products over others. Such preference may be caused by physical or character traits, such as age, gender, socialization or taste, and are generally not measurable directly in many contexts. Very often preferences are anonymized but notwithstanding representing a consumer-relation. Without the ability to stratify according to such secondary variables, many consumer trends and selling opportunities may go undetected.

In such a context, our methodology allows to ascertain the presence of collective latent preferences of groups of agents for groups of products. Further, it allows assigning all agents in a population into latent classes with high uniformity with regard to their preferences. These results may be used in targeting marketing campaigns, recommendation systems or, enriched with secondary information, for market segmentation studies.

In short, we describe a method that abstracts agent-object interactions as networks (graphs) and self consistently assigns agents and objects into latent classes, such that agents assigned to the same class have similar patterns of interaction with objects and objects assigned to the same class in turn have similar patterns of interactions with agents.

In contrast to previous approaches, our method does not require any kind of dimensionality reduction in order to find a segmentation of agents and objects into meaningful latent classes. Rather, it works directly on the raw relational data of agent-object interaction, regardless of high-dimensionality or sparsity (or sparseness), or both. It directly finds a segmentation of agents and objects into latent classes by maximizing a quality function that is defined on the raw data.

In a specific implementation, a method includes providing a data source having off-line activity data; transforming the data in the data source into a network format including aggregating agent-object interactions into unique node-link-node tuples that describe the interaction; aggregating the agent-object interactions into unique node-link-node tuples that describe the interaction; initializing sum statistics in a quality function indicating a number of interactions between nodes in different classes; optimizing the assignment of agents into agent classes and objects into object classes as to extremize the quality function until an extremum is reached or maximum allowable computer run time has passed; and outputting an assignment of agents/objects into latent classes, either deterministic or probabilistically, onto computer-readable storage.

Further, the optimizing can include selecting a subset of nodes randomly from a network; looping over this subset and aggregate the interactions each node in this subset has with nodes in each class; looping over this subset again and for each node in it, calculate a change in quality function if this node were to be moved from its current class to any of the other classes using the information collected in the last step and the sum statistics; looping over this subset again and changing the assignments of nodes into classes as to increase the quality function; and updating the value of the quality function and the sum statistics according to the changes made in a previous looping step.

Further, the method can include looping over all classes and for each class of nodes and calculating a change in the quality function if all nodes in this class were to be moved to any other class; and when an improvement in quality is possible, moving all nodes to the new class and updating the sum statistics. The method can include determining if a fraction of nodes that have changed their class assignment is greater than 1 percent.

The looping over this subset again and changing the assignments of nodes into classes as to increase the quality function can include using probabilistic sampling using to a Metropolis algorithmic approach or Heat-Bath algorithmic approach.

In a specific implementation, a method includes providing a dataset generated off-line and applied to off-line purposes; analyzing the large dataset of off-line activity; extracting hidden information and inferring latent or unobserved structure in relational data sets without any kind of dimensionality reduction by defining a quality function on the relational dataset; maximizing the quality function finds a segmentation of agents and objects into meaningful latent classes existing in the dataset; and operating on the raw data, without preprocessing and without the need for prior knowledge on the dataset.

The method can include extracting the collective preference of a group of consumers for a class of certain types of products over others, and assigning all agents in a population into latent classes with high uniformity with regard to their preferences. The method can include extracting the collective preference of a group of products for a class of certain types of features over others, and assigning all products in a dataset into latent classes with high uniformity with regard to their features.

The method may have the extracted preferences defining optimal targeting of marketing campaigns off-line. The dataset generated off-line can include at least one of retail statistics, statistical research, scientific analysis, or off-line interaction between customers or users. The off-line purpose can include at least one of the analysis of credit card data, club card data, telephone data, research data, financial market data, insurance data, warehouse data, travel data, traffic data, health care system data, public administration and authorities data, logistics data, education based data, or behavioral pattern data.

Analyzing the large dataset of off-line activity can include using only relational data sets which even are completely anonymized.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
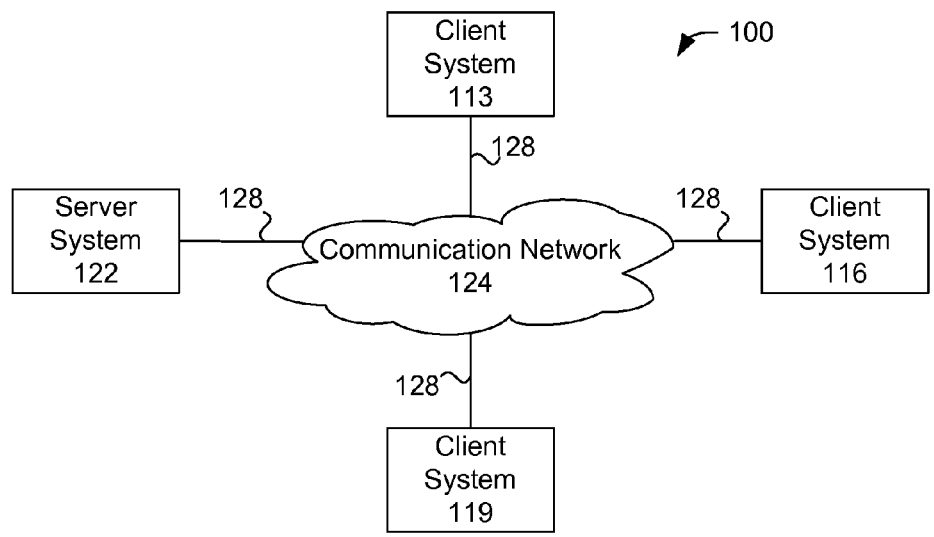
FIG. 1 shows a simplified block diagram of a client-server system and network in which an embodiment of the invention may be implemented.

FIG. 1 is a simplified block diagram of a distributed computer network 100 which embodiment of the present invention can be applied. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a client application (such as a "web browser") executing on a client system enables users to select, access, retrieve, or query information stored by server system 122. Examples of client applications can include web browsers, such as the Internet Explorer browser program provided by Microsoft Corporation, and the Firefox browser provided by Mozilla, and others, and any kind of custom terminal- or mobile-device-software.

Figure 2:
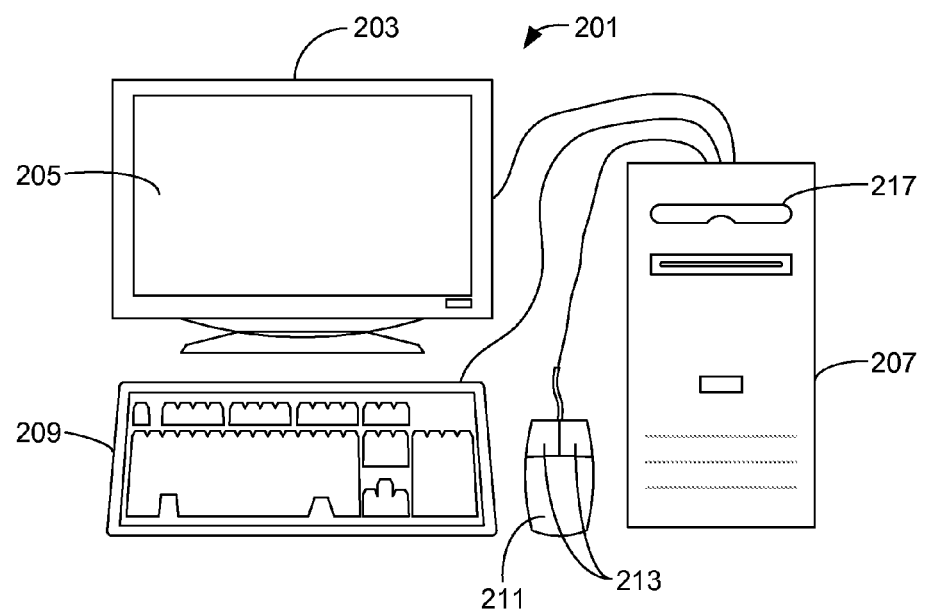
FIG. 2 shows a more detailed diagram of an exemplary client or server computer which may be used in an implementation of the invention.

FIG. 2 shows an exemplary computer system (e.g., client or server) of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
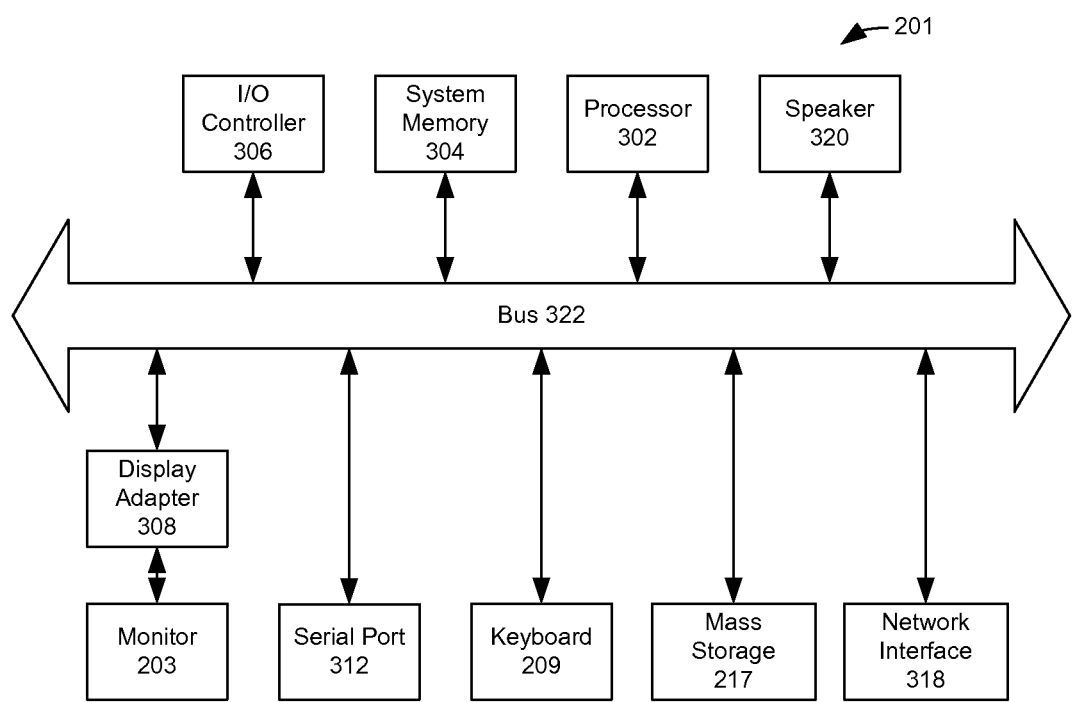
FIG. 3 shows a system block diagram of a client or server computer system used to execute application programs such as a web browser or tools for building a social graph according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Python, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows CE, Windows Mobile), Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Segmenting large, sparse high dimensional relational datasets has employed a two-step strategy of first reducing the dimensionality of the data and thereby removing sparsity.

Dimensionality reduction for relational data has employed two main approaches. A first approach is to calculate an embedding, i.e., a position, of agents and objects in a lower dimensional space through some sort of low rank approximation of the raw data, such as spectral or singular value decomposition (SVD), non-negative matrix factorization (NMF) or a probabilistic factorizations such as probabilistic latent semantic analysis (pLSI). By assigning each object and agent a position in a lower dimensional space, these methods produce dense data, which can subsequently be segmented with clustering algorithms geared towards the analysis of multivariate data.

A second approach is to reduce sparseness and high dimensionality of the object space through the use of available metadata, such as a segmentation of objects into product categories. Then, users can be segmented with respect to preferences for certain categories using algorithms geared towards the analysis of dense data sets.

The use of metadata for dimensionality reduction in the object space bears several problems. First, metadata may not always be readily available and often costly to obtain, as it often requires human oversight to classify objects into product categories. Second, the use of product categories injects a bias in the possible preferences of consumers that can be detected. Once two products are assigned into the same category, a possible division of users due to differing preference will go undetected. This means that in order to assign meaningful product categories along which to differentiate user preferences, one already has to know user preferences.

Fourth, product categories generally measure product similarity, while consumer segments are governed by choices of complementary objects. Consider the example of two users furnishing a living room from some store. Both users buy articles from the same product categories, such as a table, a TV stand, a couch, or the like, and would hence be classified as similar based on the product categories they shop. However, upon inspecting the two living rooms one may find very stark differences in the taste of the two consumers. Hence, using their seeming similarity in a recommender system based on product categories is doomed to fail. In short, product metadata is often maintained to ease the search for products as it presents a taxonomy of similar objects. Consumer interest is, however, revealed as preference for one out of a group of similar objects and the complementarily of choices.

The use of embedding techniques has a different set of problems. One problem is the essentially arbitrary choice of an error function between the original data and the dimension-reduced embedding as this has a huge impact on the embedding which in turn is used to find a segmentation of users. A larger problem, however, is that information is thrown away in the embedding and noise is injected in the data. Typically, the numbers of observations for interactions between agents and objects are very broadly distributed, often spanning several orders of magnitude. The mean of such distributions is generally not typical for this distribution (e.g., the majority of agents/objects has much less interactions per agent/object than the mean), while some agents/objects have a much higher number of interactions than the mean value.

When all of these agents/objects are embedded into a space of fixed dimension, information is thrown away for agents/objects for which a lot of interactions were observed, while information is imputed and hence noise injected for agents/objects for which only a few interactions were observed. As an example consider the embedding into a 10-dimensional spaces using a singular value decomposition. An agent for whom 100 interactions were observed is assigned a position in this 10-dimensional space and hence the dimensionality of his preference space is reduced and information is thrown away. Equally, an agent for which only five interactions with objects have been recorded is assigned a position in this very same 10-dimensional space and hence, information has been imputed.

Both of these effects are detrimental to the accuracy of determining the latent classes of user interest in a subsequent application of clustering algorithms on the dimensionality-reduced data. A further problem is that an embedding has to be recalculated when new data, i.e., new interactions between users and objects, arrive. Hence, an implementation that tracks temporal changes in a segmentation can be computationally very expensive, in particular, as the inclusion of one new user-object interaction will generally change the position of the embedding of all other users and objects slightly.

Object: Any identifiable unit, physical or nonphysical, such as, but not limited to, a product, an event, a display item, and the like.

Agent: Any identifiable unit, which interacts in some way with an object, such as, but not limited to, consumers, users, participants, and the like. Agents can also be objects when interacting with other agents.

Interaction: A relation between at least one agent and at least one object, such as, but not limited to, buying a product, requesting particular information, filling out a questionnaire, reacting on a request, and the like.

Relational data: In contrast to multivariate data, which describes measurements of objects, relational data describes interactions between agents and objects in a quantitative way.

Network: Representation of relational data as a graph. Objects and agents are represented as nodes, interactions between objects and agents as links.

Quality function: A function that, for any given network and assignment of nodes into classes, assigns a real valued score. Depending in the application, this score may measure intra-class homogeneity and interclass inhomogeneity of the link patterns or any other quantity that is purely a function of the assignment of nodes into classes for a given network. Since the quality function is only a function of the assignment of nodes into classes and the given network, this function must be invariant under a permutation of the class labels. The change of score when moving a node from one class to another must be computable with a number of calculations that scales as the number of direct links of that node and at most the number of latent classes squared. Several of such functions are possible and can be used depending on the application desired.

Latent class: A collection of more than one object or agent, i.e., nodes in the network.

Some sample flows are presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

General Program Flow

A. Input

Any collection of interactions between agents and objects of any single or multiple origins, from a file or a database.

B. Data Transformation into Network Format

Aggregate agent-object interactions into unique node-link-node tuples that describe the interaction, i.e., assign unique Node-IDs to unique agents and unique Node-IDs to unique objects, aggregate all interactions between the same agent and the same object into a single, possibly, weighted link.

C. Initialization

C1 Assign each unique agent into one of the latent agent classes, assign each unique object into one of the latent object classes. This may be done randomly, using appropriate prior knowledge or the output of another algorithm.

C2 Initialize the sum statistics (m and K in figure) needed in the quality function, such as, the number of interactions between all nodes in different classes, the total number of interactions with nodes in each class, and so forth.

D. Optimization

Optimize the assignment of agents into agent classes and objects into object classes as to extremize a quality function Stop, when extremum reached or maximum allowable runtime passed E. Output E1 Output the assignment of agents into latent classes, either deterministic (i.e., one agent is assigned into one and only one of mutually exclusive classes) or probabilistically (i.e., one agent may be assigned to several of mutually exclusive classes with probabilities<1) into a file or database Output the assignment of objects into latent classes, either deterministic or probabilistically into a file or database Optimization in Detail D1. Choose a subset of nodes randomly from the network D2. Loop over this subset and aggregate the interactions each node in this subset has with nodes in each class D3. Loop over this subset again and for each node in it, calculate the change in quality function if this node were to be moved from its current class to any of the other classes using the information collected in step D2 and the sum statistics m and K.

D4. Loop over this subset again and change the assignments of nodes into classes as to increase the quality function, possibly employing probabilistic sampling using a Metropolis or Heat-Bath algorithm.

D5. Update the value of the quality function and the sum statistics m and K according to the changes made in D4

D6. If all nodes in the network have been considered for a change of assignment at least once, loop over all classes and for each class of nodes, calculate the change in quality function if all nodes in this class were to be moved to any other class. If an improvement in quality is possible, move all nodes to the new class and update the sum statistics m and K D7. If the quality does not increase anymore under changes of nodes from class to class or a time limit is reached, end, otherwise continue with step D1.

By working directly on the raw data, our method does not suffer from noise and bias injected through dimensionality reducing techniques. By avoiding a dimensionality reducing step, it is faster than techniques requiring such a step. It can be easily be implemented in an on-line setting where the interactions between users and objects are continuously changing.

The method is generally applicable to the analysis of any kind of relational dataset. Its intended use lies in market analysis when acting as a consultant as well as in the computation of user/object segments to be used for marketing and all kinds of personalized interaction as well as sociological and technical research, and the like.

Figure 4:
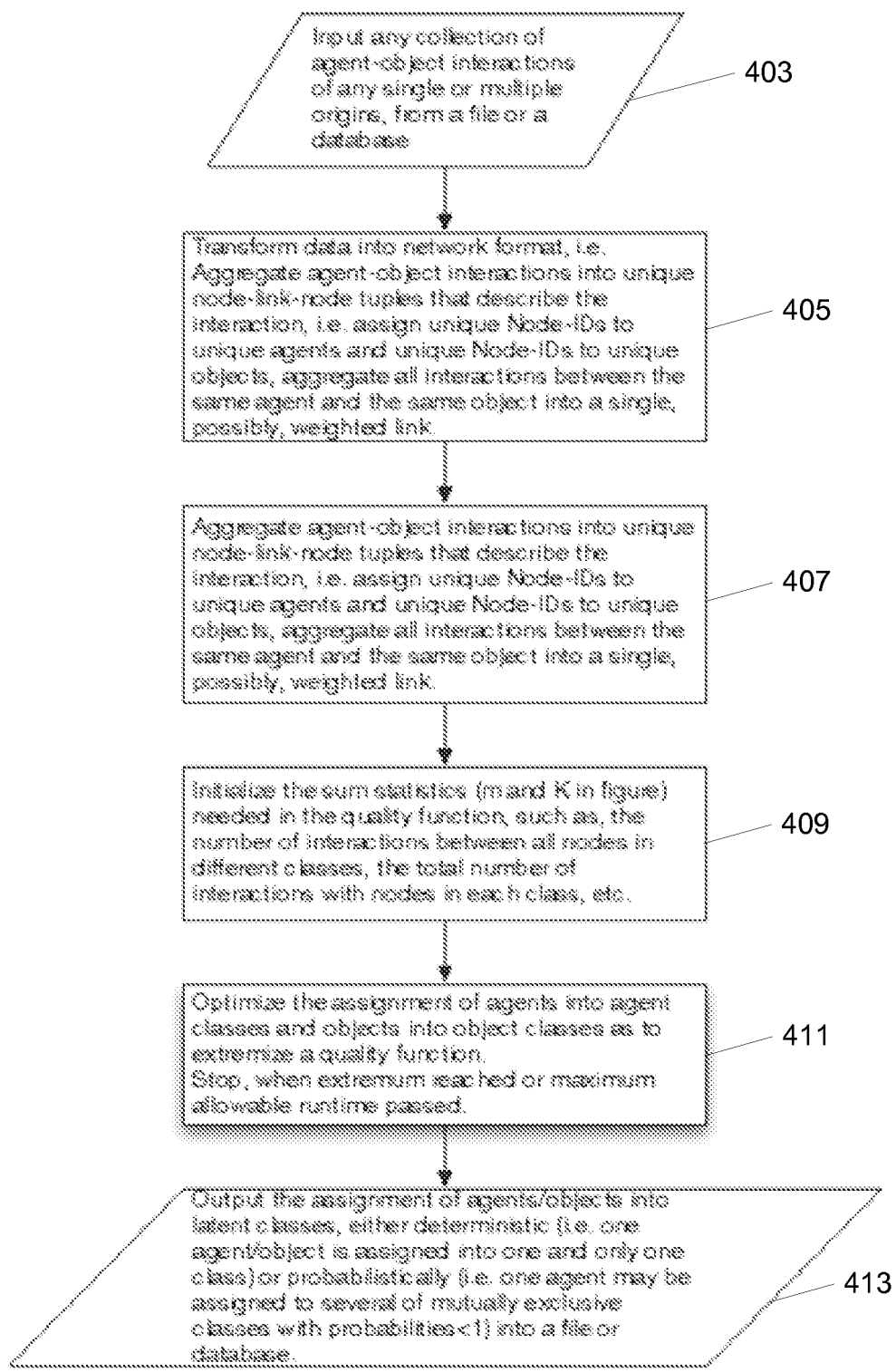
FIG. 4 shows a general flow.

FIG. 4 shows a general flow. In a step 403, a technique includes inputting any collection of agent-object interactions of any single or multiple origins, from a file or a database.

In a step 405, transform data into network format, i.e., aggregate agent-object interactions into unique node-link-node tuples that describe the interaction, i.e., assign unique Node-IDs to unique agents and unique Node-IDs to unique objects, aggregate all interactions between the same agent and the same object into a single, possibly, weighted link.

In a step 407, aggregate agent-object interactions into unique node-link-node tuples that describe the interaction, i.e., assign unique Node-IDs to unique agents and unique Node-IDs to unique objects, aggregate all interactions between the same agent and the same object into a single, possibly, weighted link.

In a step 409, initialize the sum statistics (m and K in figure) needed in the quality function, such as the number of interactions between all nodes in different classes, the total number of interactions with nodes in each class, and so forth.

In a step 411, optimize the assignment of agents into agent classes and objects into object classes as to extremize a quality function. Stop, when extremum reached or maximum allowable runtime passed.

In a step 413, output the assignment of agents/objects into latent classes, either deterministic (i.e., one agent/object is assigned into one and only one class) or probabilistically (i.e., one agent may be assigned to several of mutually exclusive classes with probabilities<1) into a file or database.

Figure 5:
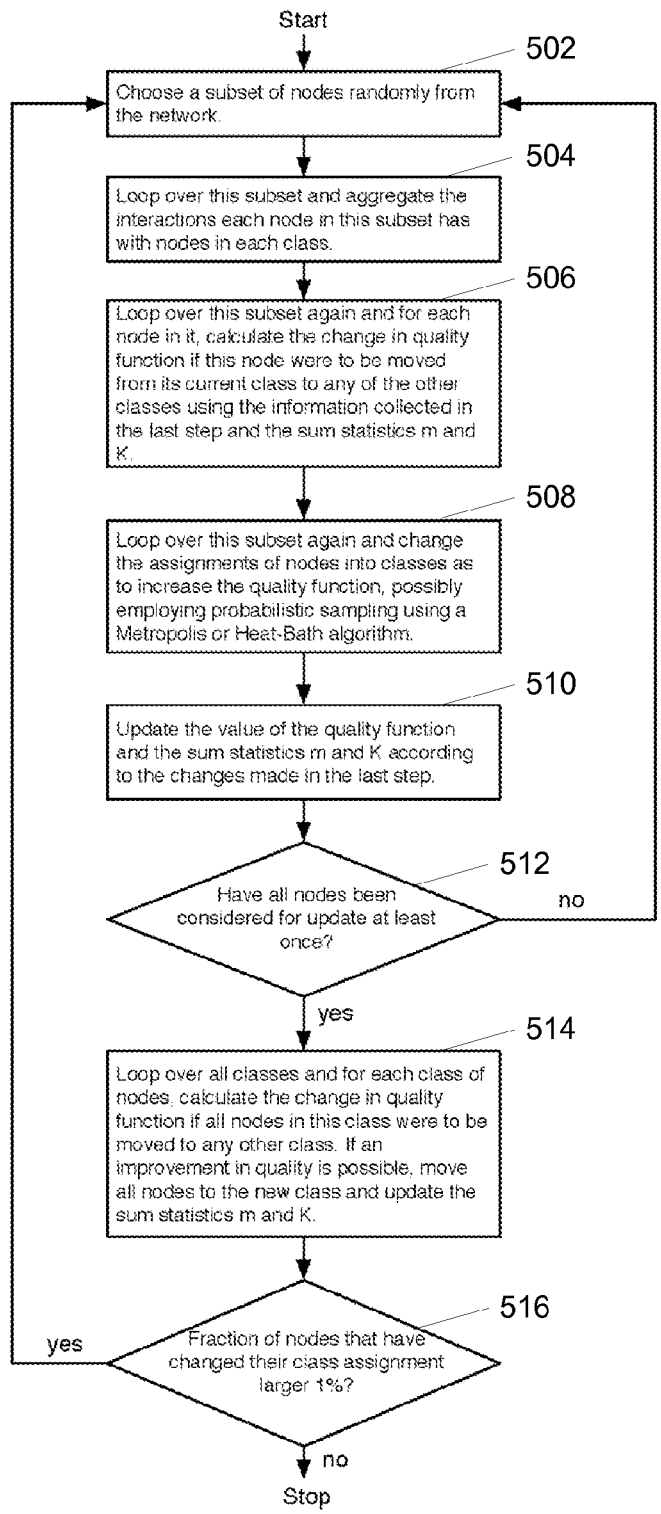
FIG. 5 shows an optimization flow.

FIG. 5 shows an optimization flow. In a step 502, a technique includes choose a subset of nodes randomly from the network.

In a step 504, loop over this subset and aggregate the interactions each node in this subset has with nodes in each class.

In a step 506, loop over this subset again and for each node in it, calculate the change in quality function if this node were to be moved from its current class to any of the other classes using the information collected in the last step and the sum statistics m and K.

In a step 508, loop over this subset again and change the assignments of nodes into classes as to increase the quality function, possibly employing probabilistic sampling using a Metropolis or Heat-Bath algorithm.

In a step 510, update the value of the quality function and the sum statistics m and K according to the changes made in the last step.

In a step 512, have all nodes been considered for update at least once? If a result of step 512 is no, proceed to step 502. In a result of step 512 is yes, proceed to a step 514.

In step 514, loop over all classes and for each class of nodes, calculate the change in quality function if all nodes in this class were to be moved to any other class. If an improvement in quality is possible, move all nodes to the new class and update the sum statistics m and K.

In a step 516, determine if a fraction of nodes that have changed their class assignment larger 1 percent. If a result of step 516 is yes, proceed to step 502. In a result of step 516 is no, then stop.

Figure 6:
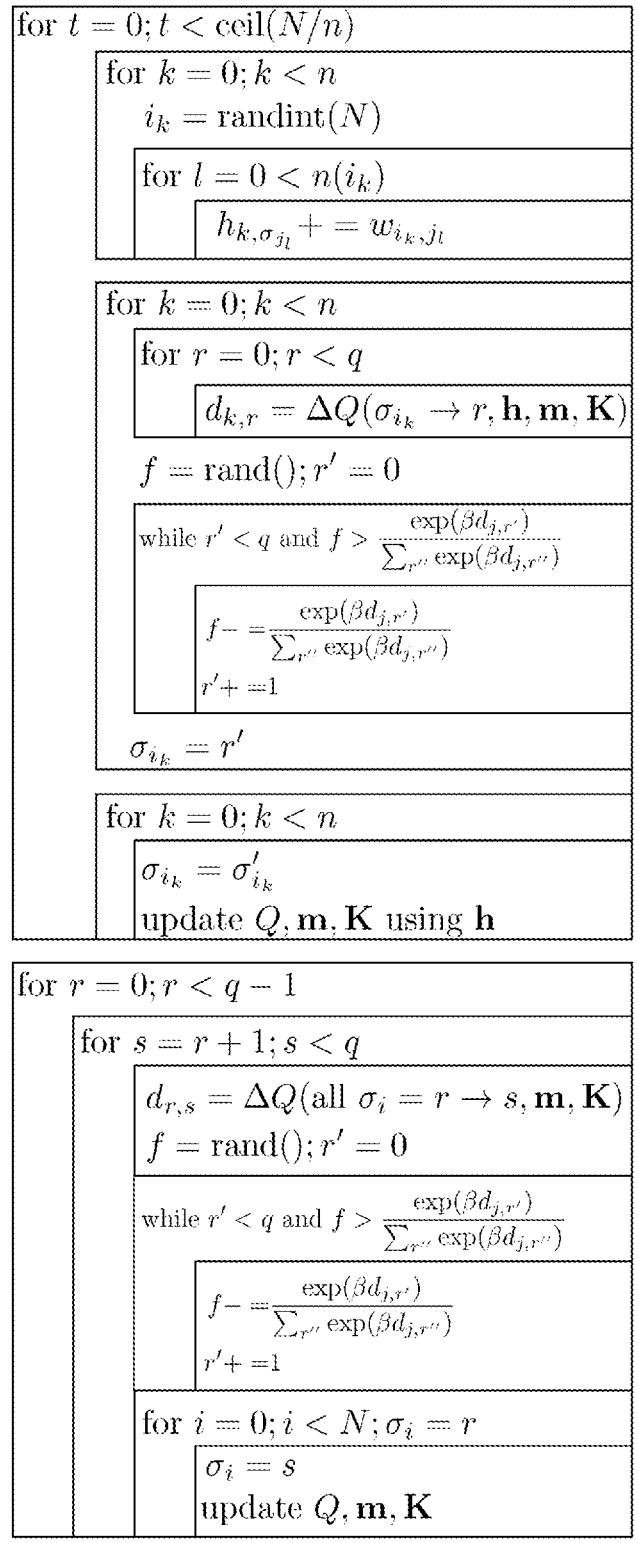
FIG. 6 shows an algorithm flow.

FIG. 6 shows an algorithm flow.

Figure 7:
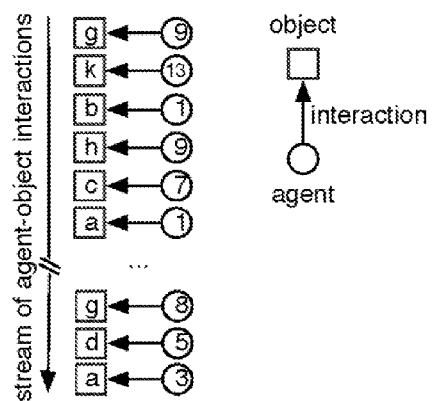
FIG. 7 shows a sample input data stream for a flow.

FIG. 7 shows a sample input data stream for a flow. Data is gathered as pairs of interactions between agents and objects.

Figure 8:
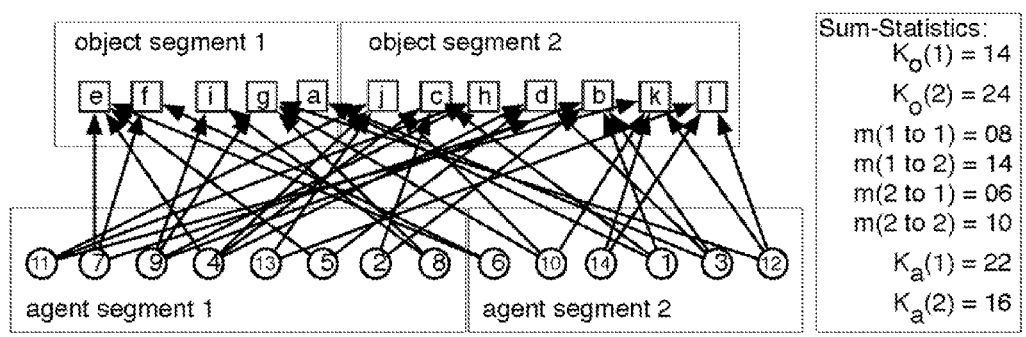
FIG. 8 shows a step in the flow before optimization.

FIG. 8 shows a step in the flow before optimization. Collection of pairwise agent-object interactions is transformed into a network. Objects and agents are assigned into latent classes (segments) randomly before the optimization is started.

Figure 9:
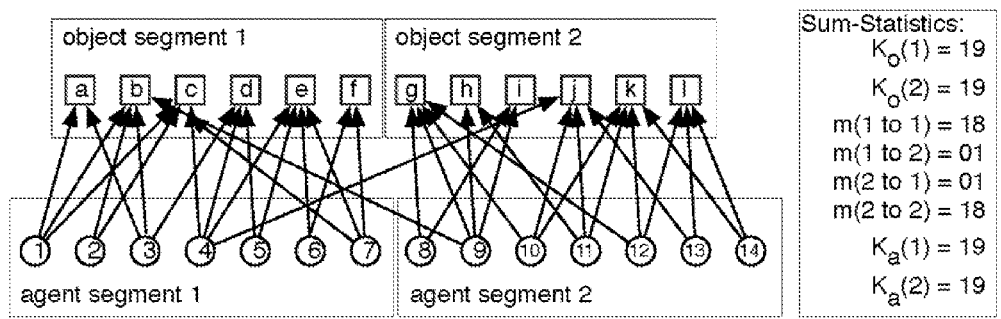
FIG. 9 shows a step in the flow after optimization.

FIG. 9 shows a step in the flow after optimization. The optimization routine finds an assignment of objects and agents into latent classes (segments) such that two agents (objects) are assigned into the same class if they interact in the same way with objects (agents) in the same class. The notion of "in the same way" is made operational through the use of a quality function. In the simple example shown, agents in agent-segment 1 interact predominantly with objects in object-segment 1, while agents in agent-segment 2 interact predominantly with objects in object segment 2.

In a specific implementation, a data source can be data created off-line, such as data created off-line, during shopping, through research, through science, through off-line interactions, and through off-line events.

The types of data can include, for example, credit card data, club card data, telephone data, research data, financial market data, insurance data, warehouse data, travel data, traffic data, health care system data, public administration and authorities data, logistics data, education-based data, all kinds of behavioral pattern data, and the like.

The data can be used, i.e., for analytics, segmentation of buyers or users, products, and attitudes or characteristics.

Some applications of the technique include, for example, fraud management and detection, stock market predictions, credit management, retail (e.g., recommendations, discounts, advertisement, mailing, direct marketing, shop organization, stock management, trend detection, product analysis (e.g., build user-mood boards for creative/design), basket of commodities, structure of population, and the like.

Some customers or users can include, for example, insurance companies, banking houses, credit card companies, broker, trend scouts, pharmaceutical companies, governments, market researchers, product developers, advertisers, and trading companies.

Some specific examples of applications of the technique include:

Credit Card Fraud Detection. User uses Credit Card for payment. All products and services are tracked and saved as personal user profile. Across all users, certain user will share same interests, taste and behaviors. By using the method described above, users are segmented in different user clusters. Clusters are dynamically updated with additional user actions. Fraud detection in case of theft due to an immediate change in user behavior, atypical for the specific user segment. Additionally all user information can be used for improving individual CRM.

Club Cards. Currently all information gathered from consumers using club cards or loyalty cards is used for statistical analysis, whilst statistical systems need to decrease the number of dimensions by establishing pre defined product groups in order to cope with big data challenges. Since the method described above does not consider any dimensional reduction or pre-assumption it can work on the fully detailed data. All changes caused by trends, newly introduced products, seasons or other influences are tracked immediately and automatically. The method does not require any additional information.

In a technique, user uses club card to collect bonus points during/after payment. All products and services are tracked and saved as personal user profile. Across all users, certain user will share same interests, taste and behaviors. By using the method described above, users are segmented in different user clusters. Clusters are dynamically updated with additional user actions. Based on the user segments and dynamically updated products, CRM (customer relationship management) can reach higher levels of relevance, personalization, re-action, i.e., additional purchases, CRM can also predict user behavior for future shopping and offer, discounts, product bundles, and so forth.

Financial Markets. The method can be used for tracking, such as sales trends, purchase trends, stock price development, index trends.

Based on tracked data, stocks will be segmented into different groups with similar behavior. When a new trend is discovered for individual stock in one segment, actions can be taken on other stocks from the same segment, predicting the specific behavior and therewith capitalizing on the information head start.

For example, stock A and B are in segment 1. An increase in the price of stock A can be discovered or detected. Predicting a similar behavior of stock B, stock B will be purchased. As stock B follows the trend of stock A, not only through our purchases, but the general market trend, the stock price will increase. Selling Stock B, and capitalizing on the increased demand (which corresponds to an increase in stock price).

In a specific method, a computer-executable technique or computer program performs: for the analysis of large datasets generated off-line and applied to off-line purposes. Off-line refers to non-web or non-www based activity or purposes.

The technique is able to extract hidden information and infer latent or unobserved structure in relational data sets without any kind of dimensionality reduction by defining a quality function on the relational dataset.

The technique can maximize this quality function finds a segmentation of agents and objects into meaningful latent classes existing in the dataset.

The technique can operate on the raw data, without preprocessing and without the need for prior knowledge on the dataset.

The technique extracts the collective preference of a group of consumers (buyers or users) for a class of certain types of products over others, and assigning all agents in a population into latent classes with high uniformity with regard to their preferences.

The technique extracts the collective preference of a group of products for a class of certain types of features (or users) over others, and assigning all products in a dataset into latent classes with high uniformity with regard to their features.

With the extracted preferences, the technique can define optimal targeting of marketing campaigns off-line, i.e., direct mail, of off-line recommendation systems or, enriched with secondary information, generating market segmentation studies.

The technique can operate on datasets generated off-line, i.e., not generated by web-based interactions (for example in, but not limited to, retail statistics, statistical research, scientific analysis, off-line interaction between, for example, customers or users, and others) and applied to off-line purposes (i.e., non-web-based purposes) as, for example, but not limited to, the analysis of credit card data, club card data, telephone data, research data, financial market data, insurance data, warehouse data, travel data, traffic data, health care system data, public administration and authorities data, logistics data, education based data, as well as behavioral pattern data.

In a specific implementation, the technique needs only relational data sets witch even can be completely anonymized. For example, no names, product codes, or similar information is needed in addition to the even in anonymized data still existing relation.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a data source comprising off-line activity data;
   using at least one processor, transforming the data in the data source into a network format comprising aggregating agent-object interactions into unique node-link-node tuples that describe the interaction;
   using at least one processor, aggregating the agent-object interactions into unique node-link-node tuples that describe the interaction;
   using at least one processor, initializing sum statistics in a quality function comprising a number of interactions between nodes in different classes;
   using at least one processor, optimizing the assignment of agents into agent classes and objects into object classes as to extremize the quality function until an extremum is reached or maximum allowable computer run time has passed, wherein the optimizing comprises:
   selecting a subset of nodes randomly from a network;
   looping over this subset and aggregate the interactions each node in this subset has with nodes in each class;
   looping over this subset again and for each node in it, calculate a change in quality function if this node were to be moved from its current class to any of the other classes using the information collected in the last step and the sum statistics;

looping over this subset again and changing the assignments of nodes into classes as to increase the quality function; and updating the value of the quality function and the sum statistics according to the changes made in a previous looping step; and outputting an assignment of agents/objects into latent classes, either deterministic or probabilistically, onto computer-readable storage.

2. The method of claim 1 comprising:

looping over all classes and for each class of nodes and calculating a change in the quality function if all nodes in this class were to be moved to any other class; and when an improvement in quality is possible, moving all nodes to the new class and updating the sum statistics.

3. The method of claim 2 comprising:

determining if a fraction of nodes that have changed their class assignment is greater than threshold value.

4. The method of claim 1 wherein the looping over this subset again and changing the assignments of nodes into classes as to increase the quality function comprises:

using probabilistic sampling using to a Metropolis algorithmic approach.

5. The method of claim 1 wherein the looping over this subset again and changing the assignments of nodes into classes as to increase the quality function comprises:

using probabilistic sampling using to a Heat-Bath algorithmic approach.

6. A method comprising:

providing a data source comprising off-line activity data;

using at least one processor, transforming the data in the data source into a network format comprising aggregating agent-object interactions into unique node-link-node tuples that describe the interaction;

using at least one processor, aggregating the agent-object interactions into unique node-link-node tuples that describe the interaction;

using at least one processor, initializing sum statistics in a quality function comprising a number of interactions between nodes in different classes;

using at least one processor, optimizing the assignment of agents into agent classes and objects into object classes as to extremize the quality function until an extremum is reached or maximum allowable computer run time has passed, the optimizing comprising:

selecting a subset of nodes randomly from a network;

looping over this subset and aggregate the interactions each node in this subset has with nodes in each class;

looping over this subset again and for each node in it, calculate a change in quality function if this node were to be moved from its current class to any of the other classes using the information collected in the last step and the sum statistics;

looping over this subset again and changing the assignments of nodes into classes as to increase the quality function;

updating the value of the quality function and the sum statistics according to the changes made in a previous looping step;

looping over all classes and for each class of nodes and calculating a change in the quality function if all nodes in this class were to be moved to any other class; and when an improvement in quality is possible, moving all nodes to the new class and updating the sum statistics.

7. The method of claim 6 comprising:

outputting an assignment of agents/objects into latent classes onto computer-readable storage.

* * * * *